(12) United States Patent
Hagn et al.

(10) Patent No.: US 12,472,022 B2
(45) Date of Patent: Nov. 18, 2025

(54) SURGICAL ROBOTIC SYSTEM WITH DAISY CHAINING

(71) Applicant: Covidien LP, Mansfield, MA (US)

(72) Inventors: Ulrich Hagn, Munich (DE); Alexander Nothhelfer, Munich (DE)

(73) Assignee: Covidien LP, Mansfield, MA (US)

( * ) Notice: Subject to any disclaimer, the term of this patent is extended or adjusted under 35 U.S.C. 154(b) by 267 days.

(21) Appl. No.: 17/894,518

(22) Filed: Aug. 24, 2022

(65) Prior Publication Data

US 2023/0097023 A1   Mar. 30, 2023

Related U.S. Application Data

(60) Provisional application No. 63/306,234, filed on Feb. 3, 2022, provisional application No. 63/248,005, filed on Sep. 24, 2021.

(51) Int. Cl.
*A61B 34/37* (2016.01)
*A61B 17/00* (2006.01)
*A61B 34/30* (2016.01)

(52) U.S. Cl.
CPC .... *A61B 34/37* (2016.02); *A61B 2017/00221* (2013.01); *A61B 2034/301* (2016.02); *A61B 2034/304* (2016.02); *A61B 2034/306* (2016.02)

(58) Field of Classification Search
CPC .......... A61B 34/37; A61B 2017/00221; A61B 2034/301; A61B 2034/304; A61B 2034/306; A61B 90/361; A61B 34/25; A61B 90/37; A61B 2034/2059; A61B 34/74; A61B 2034/302; A61B 34/30
See application file for complete search history.

(56) References Cited

U.S. PATENT DOCUMENTS

| | | |
|---|---|---|
| 6,527,721 B1 | 3/2003 | Wittrock et al. |
| 9,204,923 B2 | 12/2015 | Manzo et al. |
| 9,680,333 B1 | 6/2017 | Brooks et al. |
| 11,272,977 B2 | 3/2022 | Manzo et al. |
| 11,357,566 B2 | 6/2022 | Manzo et al. |

(Continued)

FOREIGN PATENT DOCUMENTS

| | | | |
|---|---|---|---|
| CN | 101160104 A | * 4/2008 | ......... A61B 17/1675 |
| CN | 105573253 B | 5/2018 | |

(Continued)

OTHER PUBLICATIONS

Translation of CN-110811880-A (Year: 2020).*

(Continued)

*Primary Examiner* — Adam R Mott
*Assistant Examiner* — James Miller Watts, III
(74) *Attorney, Agent, or Firm* — Carter, DeLuca & Farrell LLP

(57) ABSTRACT

A surgical robotic system includes a first robotic arm, a second robotic arm, a control tower, and a surgeon console. The first robotic arm is engaged with a first movable cart. The second robotic arm is engaged with a second movable cart. The control tower is configured to control movement of the first robotic arm. The surgeon console is configured to provide instructions to the control tower. The control tower is electrically coupled to the surgeon console via a first cable. The surgeon console is electrically coupled to the first movable cart via a second cable.

18 Claims, 7 Drawing Sheets

(56) References Cited

U.S. PATENT DOCUMENTS

| | | |
|---|---|---|
| 11,666,374 B2 | 6/2023 | Burbank |
| 12,262,938 B2 | 4/2025 | Manzo et al. |
| 2007/0114852 A1 | 5/2007 | Lin et al. |
| 2008/0108443 A1 | 5/2008 | Jinno et al. |
| 2010/0130986 A1* | 5/2010 | Mailloux ............... A61B 34/30 606/130 |
| 2016/0346930 A1* | 12/2016 | Hares .................... A61B 34/30 |
| 2018/0092648 A1* | 4/2018 | Sun ......................... B25J 11/00 |
| 2019/0069962 A1 | 3/2019 | Tabandeh et al. |
| 2019/0201040 A1* | 7/2019 | Messerly ......... A61B 17/07207 |
| 2019/0201111 A1* | 7/2019 | Shelton, IV ........... A61B 34/30 |
| 2019/0201118 A1* | 7/2019 | Shelton, IV ........... G16H 40/63 |
| 2019/0231460 A1 | 8/2019 | DiMaio et al. |
| 2019/0364651 A1* | 11/2019 | Wilkolaski ............. H05B 47/18 |
| 2020/0138534 A1* | 5/2020 | Garcia Kilroy ......... A61B 34/20 |
| 2020/0405414 A1* | 12/2020 | Shelton, IV ... A61B 17/320092 |
| 2022/0395338 A1* | 12/2022 | Roberts ................. A61B 34/30 |
| 2022/0401178 A1* | 12/2022 | Polchin ................. A61B 34/20 |
| 2023/0320794 A1* | 10/2023 | Scholan ................ A61B 34/30 606/1 |

FOREIGN PATENT DOCUMENTS

| | | | |
|---|---|---|---|
| CN | 110811880 A * | 2/2020 | |
| EP | 2533130 A1 | 12/2012 | |
| EP | 2923661 A2 | 9/2015 | |
| JP | 2017168950 A * | 9/2017 | |
| WO | WO-2006124390 A2 * | 11/2006 | ............. A61B 34/30 |
| WO | 2014071184 A1 | 5/2014 | |
| WO | WO-2018053349 A1 * | 3/2018 | ......... A61B 1/00149 |
| WO | 2020210106 A1 | 10/2020 | |
| WO | 2021158383 A1 | 8/2021 | |
| WO | WO-2022115685 A1 * | 6/2022 | ............. A61B 34/25 |

OTHER PUBLICATIONS

Translation of CN-101160104-A (Year: 2008).*
Translation of JP-2017168950-A (Year: 2017).*
Extended European Search Report dated Feb. 6, 2023, issued in corresponding EP Appln. No. 22197331, 9 pages.

* cited by examiner

SURGICAL ROBOTIC SYSTEM WITH DAISY CHAINING

CROSS-REFERENCE TO RELATED APPLICATIONS

This application claims the benefit of and priority to U.S. Provisional Patent Application No. 63/248,005, filed on Sep. 24, 2021 and to U.S. Provisional Patent Application No. 63/306,234, filed on Feb. 3, 2022. The entire disclosures of each of the foregoing applications are incorporated by reference herein.

BACKGROUND

Surgical robotic systems are currently being used in minimally invasive medical procedures. Some surgical robotic systems include a control tower, a surgeon console, and at least one movable cart having a surgical instrument coupled thereto. In use, each component of the surgical robotic system requires power to be able to function. Additionally, the surgeon or user may want to position the components of the surgical robotic system at different locations in the operating room, for instance. Further, minimizing lengths of power cords and/or extension cords, in addition to having flexibility in positioning the components of the surgical robotic system may be helpful.

SUMMARY

The disclosure relates to a surgical robotic system including a first robotic arm, a second robotic arm, a control tower, and a surgeon console. The first robotic arm is engaged with a first movable cart. The second robotic arm is engaged with a second movable cart. The control tower is configured to control movements of the first robotic arm. The surgeon console is configured to provide instructions to the control tower. The control tower is electrically coupled to the surgeon console via a first cable. The surgeon console is electrically coupled to the first movable cart via a second cable.

In aspects, first movable cart may be electrically coupled to the second movable cart via a third cable. In further aspects, the surgical robotic system may include a third robotic arm engaged with a third movable cart. The second movable cart may be electrically coupled to the third movable cart via a fourth cable.

In aspects, the control tower may include a power supply system therein. In further aspects, the surgeon console may be directly electrically coupled to the power supply system with the first cable, and the first movable cart may be directly electrically coupled to the surgeon console with the second cable. In further aspects, the power supply system may include a power ingress module, an electrical main configured to supply alternating current, an isolation transformer, and at least one uninterruptible power supply coupled to the isolation transformer. In further aspects, the uninterruptible power supply may be coupled to a tower power supply chassis. In further aspects, the tower power supply chassis may include a first power supply configured to provide a regulated DC output to the surgeon console via the first cable and a first connector. In further aspects, the surgeon console may include a second power supply configured to provide a regulated DC output to the first movable cart via the second cable and a second connector. In further aspects, the surgical robotic system may include a second robotic arm engaged with a second movable cart. The first movable cart may include a third power supply configured to provide a regulated DC output to the second movable cart via a third cable and a third connector.

In aspects, the surgical robotic system may include an endoscopic camera mechanically coupled to the first robotic arm. In further aspects, the surgical robotic system may include a surgical instrument mechanically coupled to a second robotic arm engaged with a second movable cart.

The disclosure also relates to a surgical robotic system includes a control tower and a plurality of components. The plurality of components includes a surgeon console, and a plurality of movable carts. Each movable cart of the plurality of movable carts has a robotic arm engaged therewith. Each component of the plurality of components is electrically coupled to another component of the plurality of components in a daisy chain arrangement.

In aspects, one component of the plurality of components may be electrically coupled to the control tower.

In aspects, each component of the plurality of components may include a power supply. In further aspects, the control tower may include a power supply. In further aspects, the surgical robotic system may include a first cable interconnecting the power supply of the control tower with one component of the plurality of components.

In aspects, each component of the plurality of components is electrically coupled to another component of the plurality of components in a closed loop daisy chain arrangement.

The disclosure also relates to a method of supplying power to a surgical robotic system including electrically coupling a surgeon console with a control tower using a first cable, electrically coupling a first movable cart with the surgeon console using a second cable, and electrically coupling a second movable cart with the first movable cart using a third cable.

In aspects, the method may include electrically coupling a power supply of a third movable cart with a power supply of the second movable cart using a fourth cable.

BRIEF DESCRIPTION OF THE DRAWINGS

Various aspects of the present disclosure are described herein with reference to the drawings wherein.

DETAILED DESCRIPTION

Figure 1:
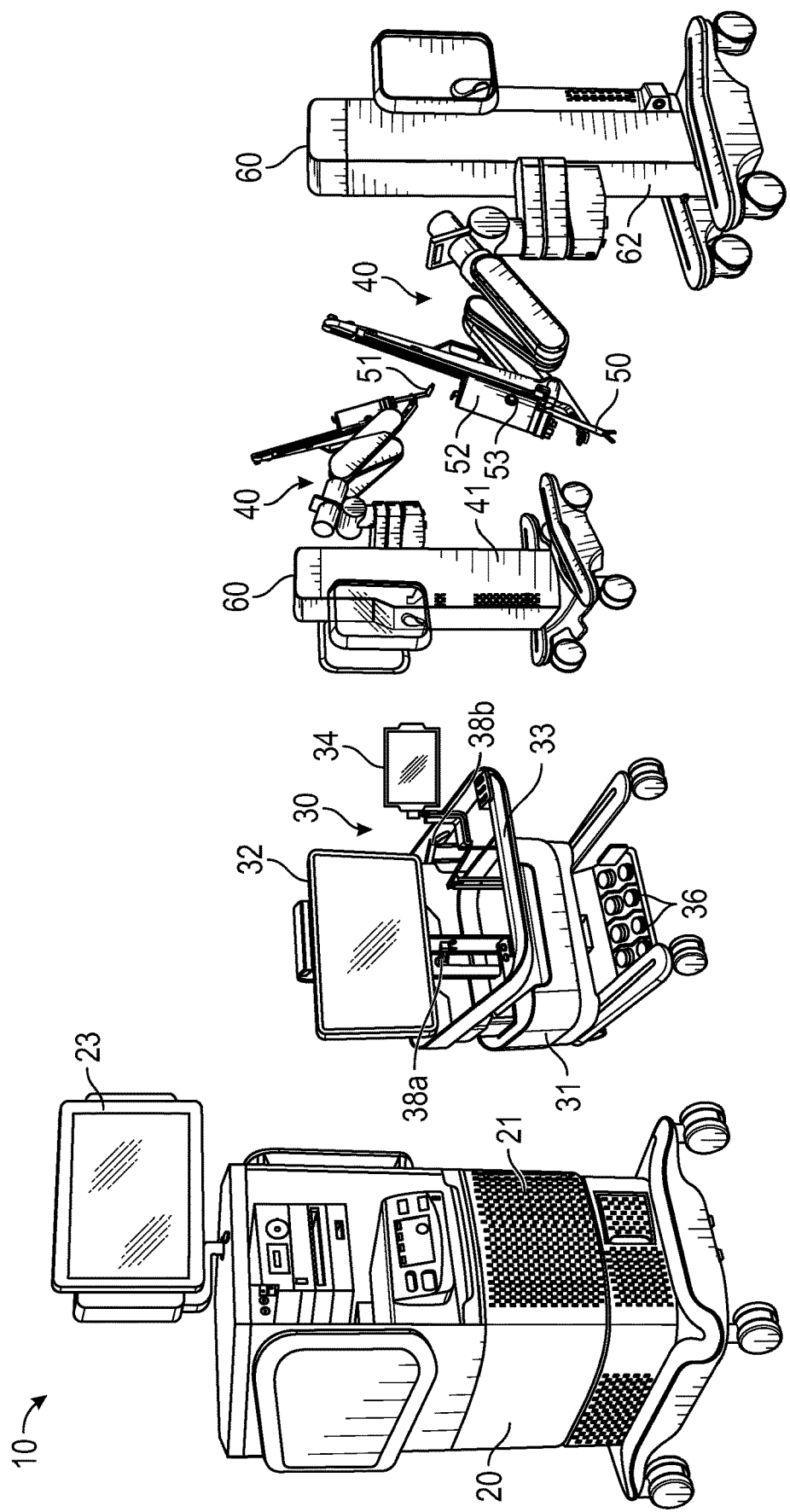
FIG. 1 is a schematic illustration of a surgical robotic system including a control tower, a surgeon console, and one or more surgical robotic arms each disposed on a movable cart according to an aspect of the present disclosure.

With reference to FIG. 1, a surgical robotic system 10 includes a control tower 20, a surgeon console 30, and one or more robotic arms 40. Each of the robotic arms 40 includes a surgical instrument 50 removably coupled thereto. Each of the robotic arms 40 is also coupled to a movable cart 60.

The surgical instrument 50 is configured for use during minimally invasive surgical procedures, for instance. In aspects, the surgical instrument 50 may be configured for open surgical procedures. In further aspects, the surgical instrument 50 may be an electrosurgical forceps configured to seal tissue by compressing tissue between jaw members and applying electrosurgical current thereto. In yet further aspects, the surgical instrument 50 may be a surgical stapler including a pair of jaws configured to grasp and clamp tissue while deploying a plurality of tissue fasteners, e.g., staples, and cutting fastened tissue. Several different types of surgical instruments 50 are usable as part of the surgical robotic system 10.

At least one of the robotic arms 40 may include an endoscopic camera 51 configured to capture video of the surgical site. In aspects, the endoscopic camera 51 may be used in connection with a movable optical head and a passive stand, and may be used without being engaged with a robotic arm 40. The endoscopic camera 51 may be a stereoscopic endoscope configured to capture two side-by-side (e.g., left and right) images of the surgical site to produce a video stream of the surgical scene. The endoscopic camera 51 is coupled to a video processing device 56 (FIG. 4), which may be disposed within the control tower 20. The video processing device 56 may be any computing device as described below configured to receive the video feed from the endoscopic camera 51, perform the image processing based on the depth estimating algorithms of the present disclosure, and output the processed video stream.

The control tower 20 includes a display 23, which may be a touchscreen, and outputs on graphical user interfaces (GUIs). The control tower 20 also acts as an interface between the surgeon console 30 and one or more robotic arms 40. In particular, the control tower 20 is configured to control the robotic arms 40, such as to move the robotic arms 40 and the corresponding surgical instrument 50, based on a set of programmable instructions and/or input commands from the surgeon console 30, in such a way that robotic arms 40 and the surgical instrument 50 execute a desired movement sequence in response to input from foot pedals 36 and/or handle controllers 38a and 38b or other user commands of the surgeon console 30.

The surgeon console 30 includes a first display 32, which displays a video feed of the surgical site provided by camera 51 of the surgical instrument 50 disposed on the robotic arm 40, and a second display 34, which displays a user interface for controlling the surgical robotic system 10. The first and/or second displays 32 and 34 may be configured as touchscreens allowing for displaying various graphical user inputs. The video processing device 56 is configured to process the video feed from the endoscopic camera 51 and to output a processed video stream on the first displays 32 of the surgeon console 30 and/or the display 23 of the control tower 20.

The surgeon console 30 also includes a plurality of user interface devices, such as foot pedals 36 and the pair of handle controllers 38a and 38b which may be used by a user to remotely control robotic arms 40, surgical instruments 50 and/or endoscopic cameras 51. The surgeon console 30 may further include an armrest 33 used to support clinician's arms while operating the handle controllers 38a and 38b, for instance.

Each of the control tower 20, the surgeon console 30, and the robotic arm 40 includes a respective computer 21, 31, 41. The computers 21, 31, 41 are interconnected to each other using any suitable communication network based on wired or wireless communication protocols. The term "network," whether plural or singular, as used herein, denotes a data network, including, but not limited to, the Internet, Intranet, a wide area network, or a local area networks, and without limitation as to the full scope of the definition of communication networks as encompassed by the present disclosure. Suitable protocols include, but are not limited to, transmission control protocol/internet protocol (TCP/IP), datagram protocol/internet protocol (UDP/IP), and/or datagram congestion control protocol (DCCP). Wireless communication may be achieved via one or more wireless configurations, e.g., radio frequency, optical, Wi-Fi, Bluetooth (an open wireless protocol for exchanging data over short distances, using short length radio waves, from fixed and mobile devices, creating personal area networks (PANs), ZigBee® (a specification for a suite of high level communication protocols using small, low-power digital radios based on the IEEE 122.15.4-2003 standard for wireless personal area networks (WPANs)).

The computers 21, 31, 41 may include any suitable processor (not shown) operably connected to a memory (not shown), which may include one or more of volatile, non-volatile, magnetic, optical, or electrical media, such as read-only memory (ROM), random access memory (RAM), electrically-erasable programmable ROM (EEPROM), non-volatile RAM (NVRAM), or flash memory. The processor may be any suitable processor (e.g., control circuit) adapted to perform the operations, calculations, and/or set of instructions described in the present disclosure including, but not limited to, a hardware processor, a field programmable gate array (FPGA), a digital signal processor (DSP), a central processing unit (CPU), a microprocessor, and combinations thereof. Those skilled in the art will appreciate that the processor may be substituted for by using any logic processor (e.g., control circuit) adapted to execute algorithms, calculations, and/or set of instructions described herein.

Figure 2:
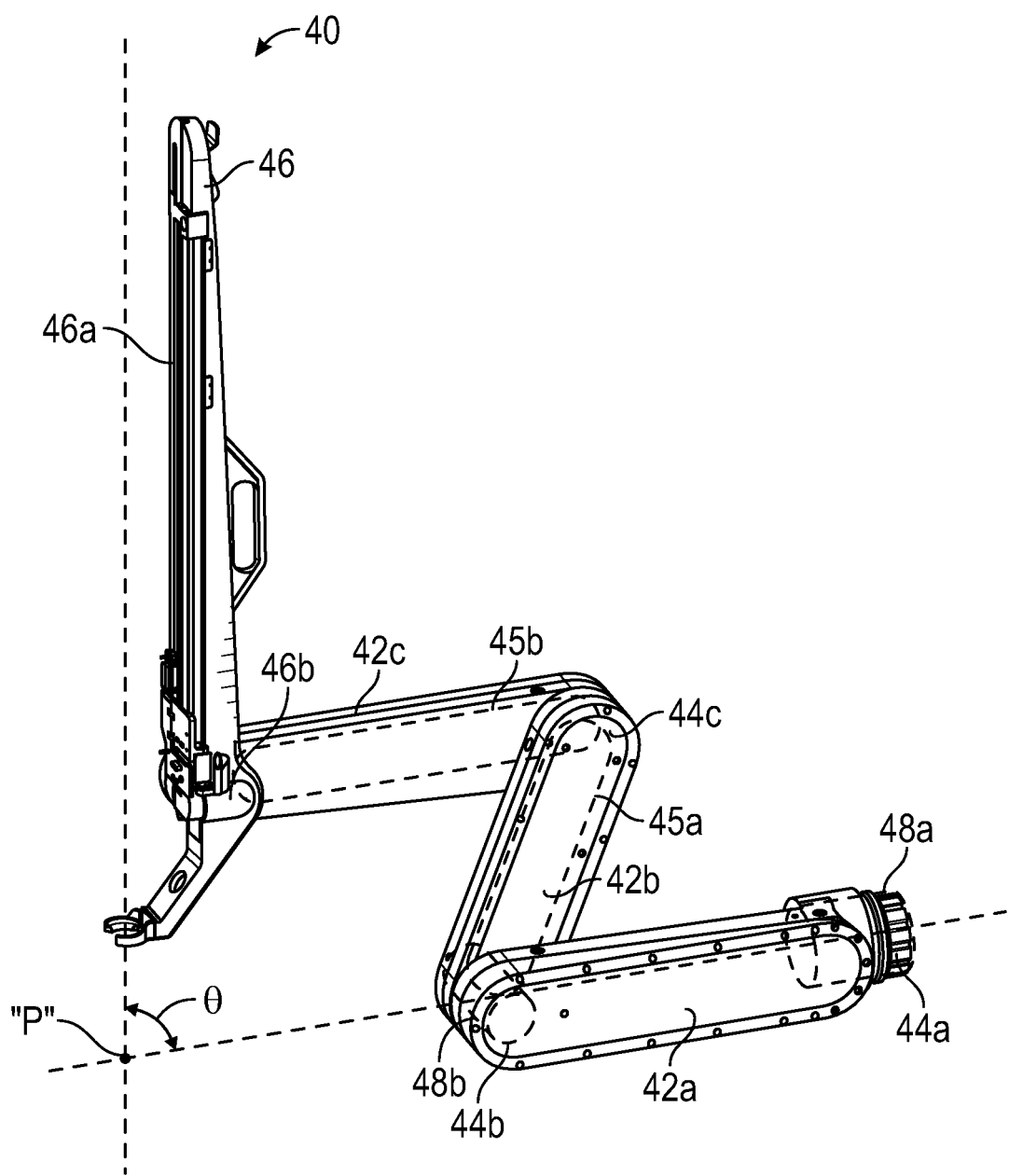
FIG. 2 is a perspective view of a surgical robotic arm of the surgical robotic system of FIG. 1 according to an aspect of the present disclosure.

With reference to FIG. 2, each of the robotic arms 40 may include a plurality of links 42a, 42b, 42c, which are interconnected at joints 44a, 44b, 44c, respectively. The joint 44a is configured to secure the robotic arm 40 to the movable cart 60 and defines a first longitudinal axis.

Figure 3:
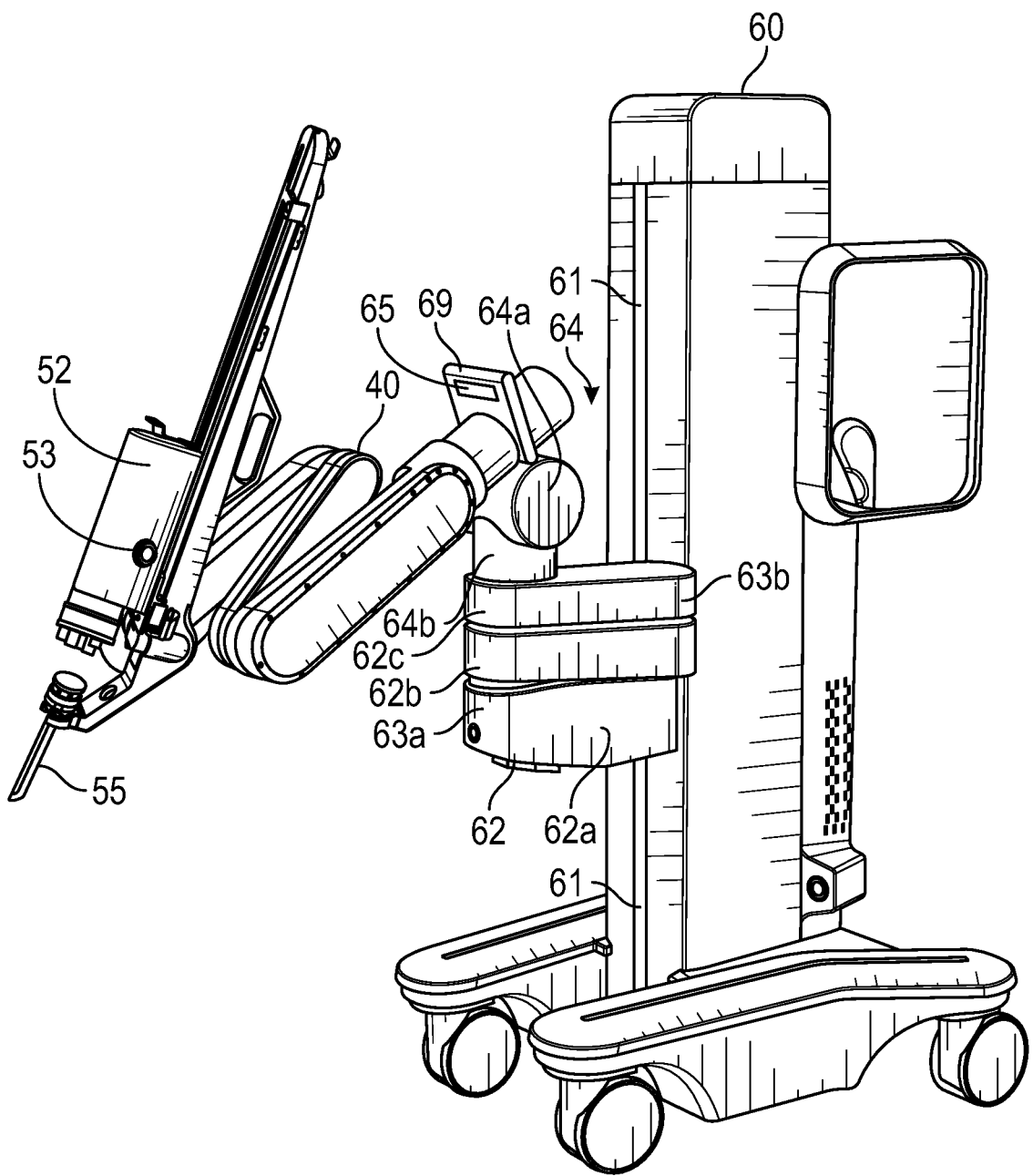
FIG. 3 is a perspective view of a setup arm with the surgical robotic arm of the surgical robotic system of FIG. 1 according to an aspect of the present disclosure.

With reference to FIG. 3, the movable cart 60 includes a lift 61 and a setup arm 62, which provides a base for mounting of the robotic arm 40. The lift 61 allows for vertical movement of the setup arm 62. The movable cart 60 also includes a display 69 for displaying information pertaining to the robotic arm 40.

The setup arm 62 includes a first link 62a, a second link 62b, and a third link 62c, which provide for lateral maneuverability of the robotic arm 40. The links 62a, 62b, 62c are interconnected at joints 63a and 63b, each of which may include an actuator (not shown) for rotating the links 62b and 62b relative to each other and the link 62c. In particular, the links 62a, 62b, 62c are movable in their corresponding lateral planes that are parallel to each other, thereby allowing for extension of the robotic arm 40 relative to the patient (e.g., surgical table). In aspects, the robotic arm 40 may be coupled to a surgical table. The setup arm 62 includes controls 65 for adjusting movement of the links 62a, 62b, 62c as well as the lift 61.

The third link 62c includes a rotatable base 64 having two degrees of freedom. In particular, the rotatable base 64 includes a first actuator 64a and a second actuator 64b. The first actuator 64a is rotatable about a first stationary arm axis which is perpendicular to a plane defined by the third link 62c and the second actuator 64b is rotatable about a second stationary arm axis which is transverse to the first stationary arm axis. The first and second actuators 64a and 64b allow for full three-dimensional orientation of the robotic arm 40.

The actuator 48b of the joint 44b is coupled to the joint 44c via the belt 45a, and the joint 44c is in turn coupled to the joint 46c via the belt 45b. Joint 44c may include a transfer case coupling the belts 45a and 45b, such that the actuator 48b is configured to rotate each of the links 42b, 42c and the holder 46 relative to each other. More specifically, links 42b, 42c, and the holder 46 are passively coupled to the actuator 48b which enforces rotation about a pivot point "P" which lies at an intersection of the first axis defined by the link 42a and the second axis defined by the holder 46. Thus, the actuator 48b controls the angle θ between the first and second axes allowing for orientation of the surgical instrument 50. Due to the interlinking of the links 42a, 42b, 42c, and the holder 46 via the belts 45a and 45b, the angles between the links 42a, 42b, 42c, and the holder 46 are also adjusted in order to achieve the desired angle θ. In aspects, some or all of the joints 44a, 44b, 44c may include an actuator to obviate the need for mechanical linkages.

The joints 44a and 44b include an actuator 48a and 48b configured to drive the joints 44a, 44b, 44c relative to each other through a series of belts 45a and 45b or other mechanical linkages such as a drive rod, a cable, or a lever and the like. In particular, the actuator 48a is configured to rotate the robotic arm 40 about a longitudinal axis defined by the link 42a. Each of the actuators 48a and b and the actuators of the joints 63a and b may also include a brake to stop rotation of the corresponding joints 44a-c and 63a and b.

With reference to FIG. 2, the robotic arm 40 also includes a holder 46 defining a second longitudinal axis and configured to receive an instrument drive unit (IDU) 52 (FIG. 1). The IDU 52 is configured to couple to an actuation mechanism of the surgical instrument 50 and/or the camera 51, and is configured to move (e.g., rotate) and actuate the instrument 50 and/or the camera 51. IDU 52 transfers actuation forces from its actuators to the surgical instrument 50 to actuate components (e.g., end effector) of the surgical instrument 50. The holder 46 includes a sliding mechanism 46a, which is configured to move the IDU 52 along the second longitudinal axis defined by the holder 46. The holder 46 also includes a joint 46b, which rotates the holder 46 relative to the link 42c. During endoscopic procedures, the instrument 50 may be inserted through an endoscopic port 55 (FIG. 3) held by the holder 46.

The robotic arm 40 may also include one or more manual override buttons 53 (FIGS. 1 and 3) disposed on the IDU 52 and/or the setup arm 62, which may be used in a manual mode. The user may press one or more of the buttons 53 to move the component associated with the button 53.

Figure 4:
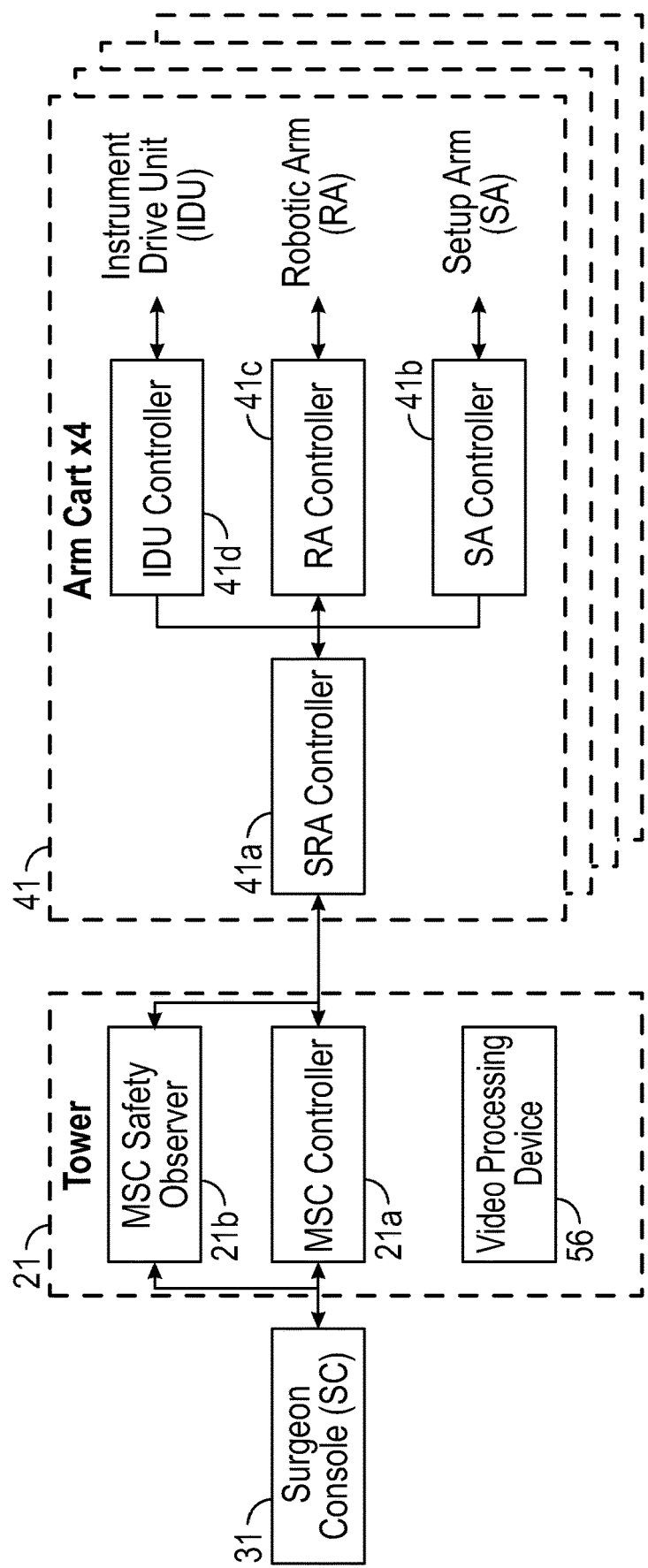
FIG. 4 is a schematic diagram of a computer architecture of the surgical robotic system of FIG. 1 according to an aspect of the present disclosure.

With reference to FIG. 4, each of the computers 21, 31, 41 of the surgical robotic system 10 may include a plurality of controllers, which may be embodied in hardware and/or software. The computer 21 of the control tower 20 includes a controller 21a and safety observer 21b. The controller 21a receives data from the computer 31 of the surgeon console 30 about the current position and/or orientation of the handle controllers 38a and 38b and the state of the foot pedals 36 and other buttons. The controller 21a processes these input positions to determine desired drive commands for each joint of the robotic arm 40 and/or the IDU 52 and communicates these to the computer 41 of the robotic arm 40. The controller 21a also receives the actual joint angles measured by encoders of the actuators 48a and 48b and uses this information to determine force feedback commands that are transmitted back to the computer 31 of the surgeon console 30 to provide haptic feedback through the handle controllers 38a and 38b, for instance. The safety observer 21b performs validity checks on the data going into and out of the controller 21a and notifies a system fault handler if errors in the data transmission are detected to place the computer 21 and/or the surgical robotic system 10 into a safe state.

The computer 41 of the robotic arm 40 includes a plurality of controllers, namely, a main cart controller 41a, a setup arm controller 41b, a robotic arm controller 41c, and an instrument drive unit (IDU) controller 41d. The main cart controller 41a receives and processes joint commands from the controller 21a of the computer 21 and communicates them to the setup arm controller 41b, the robotic arm controller 41c, and the IDU controller 41d. The main cart controller 41a also manages instrument exchanges and the overall state of the movable cart 60, the robotic arm 40, and the IDU 52. The main cart controller 41a also communicates actual joint angles back to the controller 21a.

The setup arm controller 41b controls each of joints 63a and 63b, and the rotatable base 64 of the setup arm 62 and calculates desired motor movement commands (e.g., motor torque) for the pitch axis and controls the brakes. The robotic arm controller 41c controls each joint 44a and 44b of the robotic arm 40 and calculates desired motor torques required for gravity compensation, friction compensation, and closed loop position control of the robotic arm 40. The robotic arm controller 41c calculates a movement command based on the calculated torque. The calculated motor commands are then communicated to one or more of the actuators 48a and 48b in the robotic arm 40. The actual joint positions are then transmitted by the actuators 48a and 48b back to the robotic arm controller 41c.

The IDU controller 41d receives desired joint angles for the surgical instrument 50, such as wrist and jaw angles, and computes desired currents for the motors in the IDU 52. The IDU controller 41d calculates actual angles based on the motor positions and transmits the actual angles back to the main cart controller 41a.

The robotic arm 40 is controlled in response to a pose of the handle controller controlling the robotic arm 40, e.g., the handle controller 38a, which is transformed into a desired pose of the robotic arm 40 through a hand eye transform function executed by the controller 21a. The hand eye function, as well as other functions described herein, is/are embodied in software executable by the controller 21a or any other suitable controller described herein. The pose of one of the handle controller 38a may be embodied as a coordinate position and role-pitch-yaw ("RPY") orientation relative to a coordinate reference frame, which is fixed to the surgeon console 30. The desired pose of the instrument 50 is relative to a fixed frame on the robotic arm 40. The pose of the handle controller 38a is then scaled by a scaling function executed by the controller 21a. In aspects, the coordinate position is scaled down and the orientation is scaled up by the scaling function. In addition, the controller 21a also executes a clutching function, which disengages the handle controller 38a from the robotic arm 40. In particular, the controller 21a stops transmitting movement commands from the handle controller 38a to the robotic arm 40 if certain movement limits or other thresholds are exceeded and in essence acts like a virtual clutch mechanism, e.g., limits mechanical input from effecting mechanical output.

The desired pose of the robotic arm 40 is based on the pose of the handle controller 38a and is then passed by an inverse kinematics function executed by the controller 21a. The inverse kinematics function calculates angles for the joints 44a, 44b, 44c of the robotic arm 40 that achieve the scaled and adjusted pose input by the handle controller 38a. The calculated angles are then passed to the robotic arm controller 41c, which includes a joint axis controller having a proportional-derivative (PD) controller, the friction estimator module, the gravity compensator module, and a two-sided saturation block, which is configured to limit the commanded torque of the motors of the joints 44a, 44b, 44c.

Figure 5:
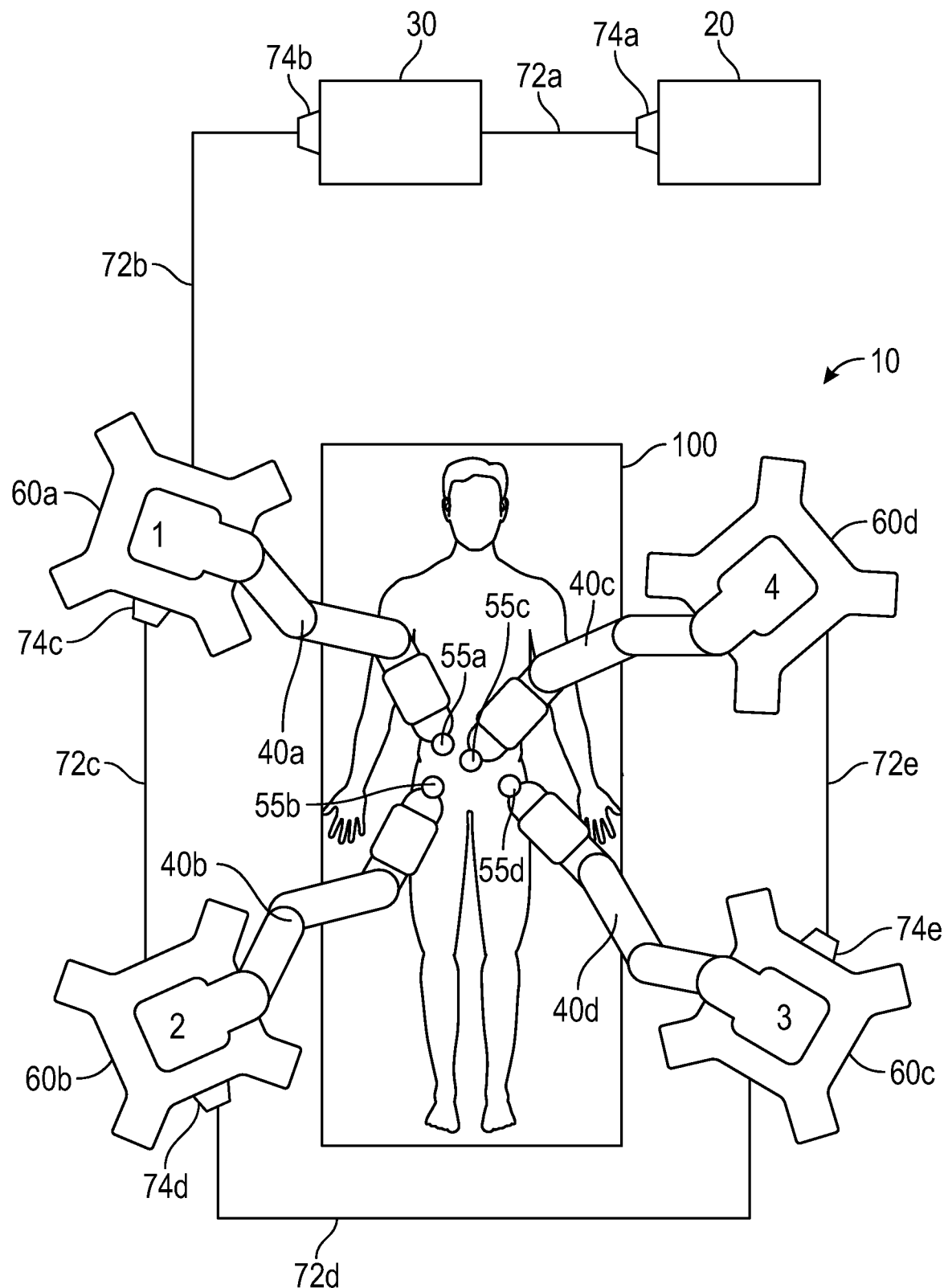
FIG. 5 is a plan schematic view of the surgical robotic system of FIG. 1 positioned about a surgical table according to an aspect of the present disclosure.

With reference to FIG. 5, the surgical robotic system 10 is shown set up around a surgical table 100. The system 10 includes the control tower 20, the surgeon console 30, and the plurality of movable carts 60a-d, which may be numbered "1" through "4." Here, the control tower 20, the surgeon console 30, and each of the movable carts 60a-d is positioned around the surgical table 100. Position and orientation of the movable carts 60a-d depends on a plurality of factors, such as placement of a plurality of ports 55a-d, which in turn, depends on the surgery being performed. Once the port placement is determined, the ports 55a-d are inserted into the patient, each of the robotic arms 40a-d is aligned to achieve a desired configuration of each of their respective joints, and the movable carts 60a-d are positioned to insert instruments 50 and the endoscopic camera 51 into corresponding the ports 55a-d. The control tower 20 and the surgeon console 30 are positioned and orientated based on the preference of the surgeon, for example. While four movable carts 60a-60d are shown, the surgical robotic system 10 may include more or fewer than four movable carts.

With continued reference to FIG. 5, electrical connections of each component of the surgical robotic system 10 are shown and include a daisy chain arrangement. More particularly, the surgeon console 30 is electrically coupled to the control tower 20 via a cable 72a having a connector 74a, the first movable cart 60a is electrically coupled to the surgeon console 30 via a cable 72b having a connector 74b, the second movable cart 60b is electrically coupled to the first movable cart 60a via a cable 72c having a connector 74c, the third movable cart 60c is electrically coupled to the second movable cart 60b via a cable 72d having a connector 74d, and the fourth movable cart 60d is electrically coupled to the third movable cart 60c via a cable 72e having a connector 74e. Additionally, in aspects, the surgical table 100 is included in the daisy chain arrangement. In such an arrangement, one of the components of the surgical robotic system 10 (e.g., the fourth movable cart 60d) would be electrically coupled to the surgical table 100 via a cable having a connector. Further, in addition to or instead of the daisy chaining of electrical connections, at least part of the daisy chain arrangement may also be used for communication.

Figure 6:
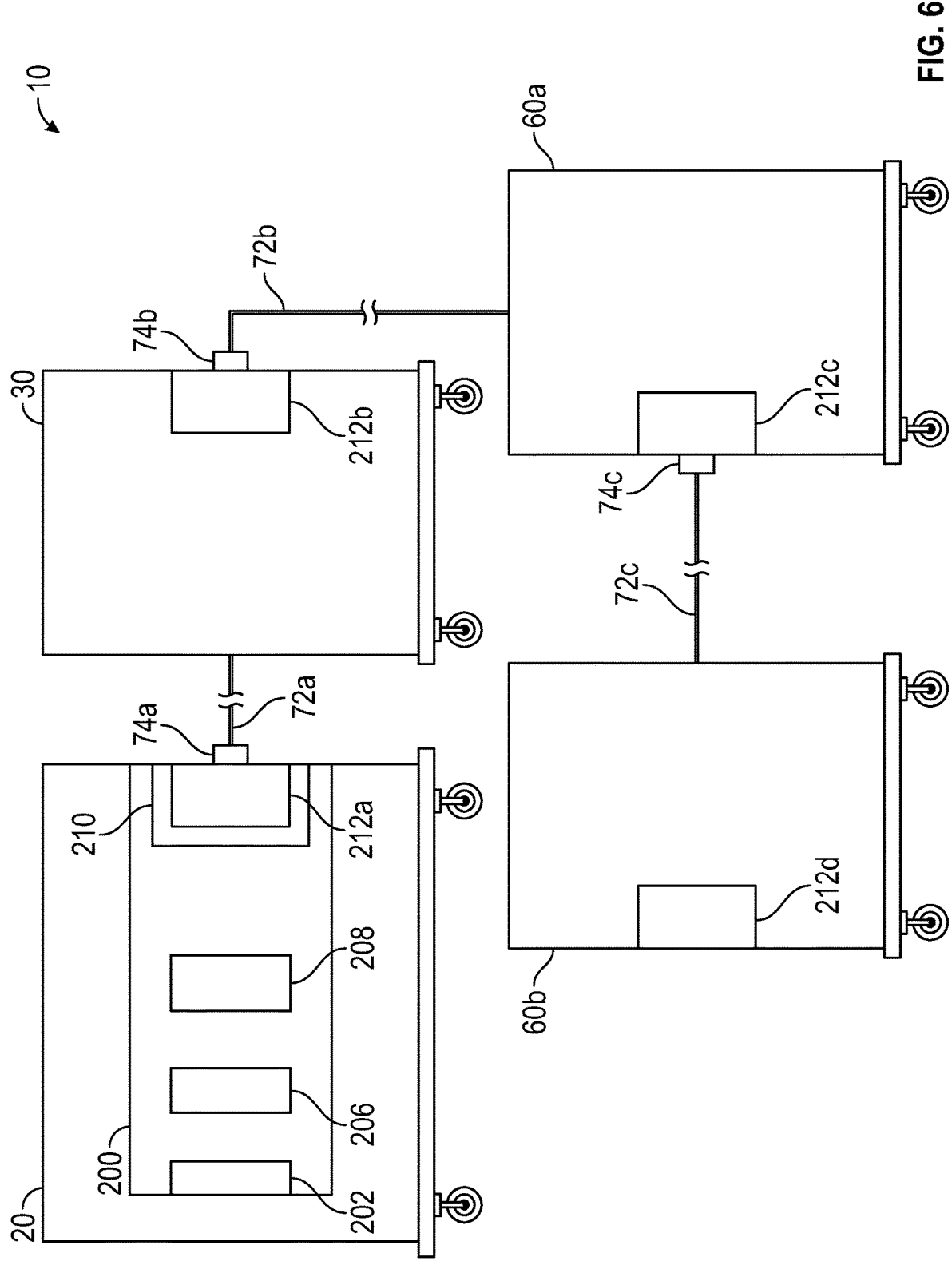
FIG. 6 is a schematic diagram of a power supply system of the surgical robotic system of FIG. 1 according to an aspect of the present disclosure.

With reference to FIG. 6, the surgical robotic system 10 includes a power supply system 200 housed in the control tower 20. The surgeon console 30 and each of the movable carts 60a-d is electrically coupled to the power supply system 200 of the control tower 20, directly or indirectly, via the cables 72a-e and the respective connectors 74a-e (only two movable carts 60a and 60b and their associated cables 72a and 72b and connectors 74a and 74b are shown in FIG. 6 for simplicity). The power supply system 200 includes a power ingress module 202 coupled to an electrical main supplying alternating current and an isolation transformer 206. The power supply system 200 also includes one or more uninterruptible power supply ("UPS") 208 coupled to the isolation transformer 206. The UPS 208 provides backup electrical power and is coupled to a tower power supply chassis ("TPSC") 210.

With continued reference to FIG. 6, in the illustrated aspect, the TPSC 210 includes a power supply 212a configured to provide a regulated DC output to the surgeon console 30 via the cable 72a and the connector 74a. The surgeon console 30 includes a power supply 212b configured to provide a regulated DC output to the first movable cart 60a via the cable 72b and the connector 74b. The first movable cart 60a includes a power supply 212c configured to provide a regulated DC output to the second movable cart 60b via the cable 72c and the connector 74d. The second movable cart 60b includes a power supply 212d configured to provide a regulated DC output to an additional movable cart. Likewise, additional movable carts (e.g., movable carts 60c and 60d) also include power supplies configured to provide a regulated DC output to other movable carts via cables and connectors. Further, while a particular orientation of the components of the surgical robotic system 10 is shown, each of the surgeon console 30 and the movable carts 60a-d are configured to be electrically coupled to any other the surgeon console 30, the movable carts 60a-d, and the control tower 20. For instance, the second movable cart 60b can be electrically coupled to the control tower 20 directly.

In this aspect, where power is supplied in a daisy chained arrangement, the overall length of power cables is minimized thereby making the operating room environment more user-friendly, easier to manage, easier to arrange, easier to setup, and safer.

Additionally, in aspects, the surgeon console 30 and/or the movable carts 60a-d include a battery to supply power (e.g., in addition to the power supply 212a-d). Here, when one of batteries is low on power or has been drained of power, the associated movable cart 60a, for instance, can be plugged into another component, such as movable cart 60b, to utilize power therefrom.

In aspects, as well as the power supplies 212a-d discussed above, the TPSC 210 may include a plurality of additional power supplies configured to provide a regulated DC output to each of the surgeon console 30 and the movable carts 60a-d. Here, the user would have an option to supply power to the surgeon console 30 and the movable carts 60a-d in the manner shown in FIGS. 5 and 6, or to be able to plug any or all of the movable carts 60a-d directly into the control tower 20.

Figure 7:
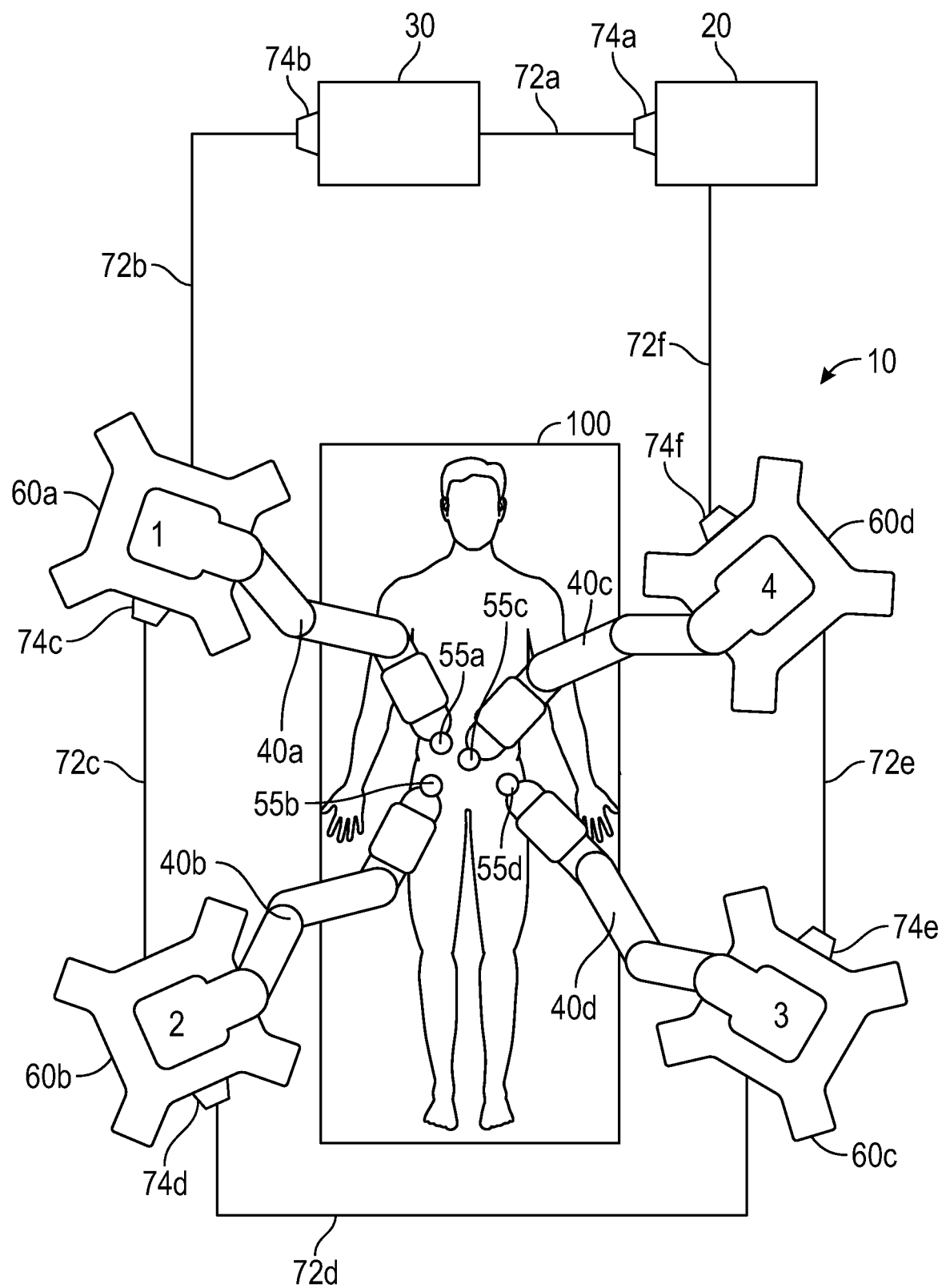
FIG. 7 is a plan schematic view of a surgical robotic system positioned about a surgical table according to another aspect of the present disclosure.

Referring to FIG. 7, the surgical robotic system 10 is shown set up around a surgical table 100 and includes an additional cable and connector as compared to the arrangement shown in FIG. 5. Here, in the embodiment illustrated in FIG. 7, the fourth movable cart 60d is electrically coupled to the control tower 20 via a cable 72f having a connector 74f. This electrical connection between the fourth movable cart 60d and the control tower 20 results in a closed loop system including the control tower 20, the surgeon console 30, and all of the movable carts 60a-d. Such a closed loop system can provide an emergency path of communication and/or power in the event one of the cables 72a-f in the chain becomes damaged or disconnected, for instance. Additionally, this closed loop system can be employed in surgical robotic systems having more or fewer than four movable carts without departing from the scope of the disclosure. Further details of the power supply system 200 are disclosed in International Application No. PCT/US21/14873, filed on Jan. 25, 2021, the entire contents of which are incorporated by reference herein.

It will be understood that various modifications may be made to the aspects disclosed herein. In aspects, the color-coded relative position, angular orientation, and operational status of each robotic arm may also be simultaneously viewable on multiple displays. Therefore, the above description should not be construed as limiting, but merely as exemplifications of various aspects. Those skilled in the art will envision other modifications within the scope and spirit of the claims appended thereto.

What is claimed is:

1. A surgical robotic system comprising:
a first robotic arm engaged with a first movable cart;
a second robotic arm engaged with a second movable cart;
a control tower configured to control movements of the first robotic arm and the second robotic arm; and
a surgeon console configured to provide instructions to the control tower,
wherein the control tower is directly electrically coupled to the surgeon console via a first cable, wherein the surgeon console is directly electrically coupled to the first movable cart via a second cable, wherein the control tower is directly electrically coupled to the second robotic arm via a third cable, wherein the control tower is free from a direct electrical coupling with the first movable cart, wherein the surgeon console is free from a direct electrical coupling with the second movable cart, wherein each of the first cable, the second cable, and the third cable is configured to transmit electrical current sufficient for supplying power for surgical procedures, and wherein at least one of the first cable, the second cable or the third cable is configured to transmit electrosurgical current.

2. The surgical robotic system according to claim 1, wherein the first movable cart is electrically coupled to the second movable cart.

3. The surgical robotic system according to claim 2, further comprising a third robotic arm engaged with a third movable cart, wherein each of the first movable cart and the second movable cart is electrically coupled to the third movable cart, wherein the surgeon console is free from a direct electrical coupling with the third movable cart.

4. The surgical robotic system according to claim 2, further comprising an endoscopic camera mechanically coupled to the first robotic arm, and a surgical instrument mechanically coupled to the second robotic arm.

5. The surgical robotic system according to claim 1, wherein the control tower includes a power supply system therein.

6. The surgical robotic system according to claim 5, wherein the surgeon console is directly electrically coupled to the power supply system.

7. The surgical robotic system according to claim 5, wherein the power supply system includes a power ingress module, an electrical main configured to supply alternating current, an isolation transformer, and at least one uninterruptible power supply coupled to the isolation transformer.

8. The surgical robotic system according to claim 7, wherein the uninterruptible power supply is coupled to a tower power supply chassis.

9. The surgical robotic system according to claim 8, wherein the tower power supply chassis includes a first power supply configured to provide a regulated DC output to the surgeon console via the first cable and a first connector.

10. The surgical robotic system according to claim 9, wherein the surgeon console includes a second power supply configured to provide a regulated DC output to the first movable cart via the second cable and a second connector.

11. The surgical robotic system according to claim 1, further comprising an endoscopic camera mechanically coupled to the first robotic arm.

12. The surgical robotic system according to claim 1, wherein each of the first robotic arm, the second robotic arm, the control tower, and the surgeon console is directly electrically coupled to two other of the first robotic arm, the second robotic arm, the control tower, and the surgeon console in a closed loop daisy chain arrangement.

13. A surgical robotic system, comprising:
a control tower;
a surgeon console directly electrically coupled to the control tower; and
a plurality of movable carts, each of which having a robotic arm engaged therewith, and each of which including a battery for supplying power,
wherein each movable cart of the plurality of movable carts is electrically coupled to another movable cart of the plurality of movable carts in a daisy chain arrangement,
wherein only a first movable cart of the plurality of movable carts is directly electrically coupled to the control tower via a cable which is configured to transmit electrosurgical current, and
wherein only a second movable cart of the plurality of movable carts is directly electrically coupled to the surgeon console.

14. The surgical robotic system according to claim 13, wherein each of the control tower, the surgeon console, and each movable cart of the plurality of movable carts is electrically coupled to two other of the control tower, the surgeon console, and each movable cart of the plurality of movable carts in a closed loop daisy chain arrangement.

15. The surgical robotic system according to claim 13, wherein the control tower includes a power supply, and wherein the surgeon console includes a power supply.

16. A method of supplying power to a surgical robotic system, comprising:
directly electrically coupling a surgeon console with a control tower using a first cable;
directly electrically coupling a first movable cart with the surgeon console using a second cable;
electrically coupling a second movable cart with the first movable cart using a third cable; and
directly electrically coupling the second movable cart with the control tower using a fourth cable,
wherein each of the first cable, the second cable, the third cable, and the fourth cable is configured to transmit electrosurgical current.

17. The method according to claim 16, wherein the surgeon console is only directly electrically coupled to the control tower and the first movable cart.

18. The surgical robotic system according to claim 16, wherein each of the control tower, the surgeon console, the first movable cart, and the second movable cart is directly electrically coupled to exactly two other of the control tower, the surgeon console, the first movable cart, and the second movable cart in a closed loop daisy chain arrangement.

* * * * *